United States Patent [19]

Gates et al.

[11] Patent Number: 5,734,848
[45] Date of Patent: Mar. 31, 1998

[54] METHOD AND APPARTUS FOR TRANSFERRING DATA IN A CONTROLLER HAVING CENTRALIZED MEMORY

[75] Inventors: Dennis E. Gates, Wichita; John R. Kloeppner, Hesston; Bret S. Weber, Wichita, all of Kans.

[73] Assignee: Symbios Logic Inc., Fort Collins, Colo.

[21] Appl. No.: 506,293

[22] Filed: Jul. 24, 1995

[51] Int. Cl.[6] ............................................. G06F 13/28
[52] U.S. Cl. ................................. 395/308; 395/309
[58] Field of Search ........................ 395/800, 308, 395/309, 551, 558, 559

[56] References Cited

U.S. PATENT DOCUMENTS

| | | | |
|---|---|---|---|
| 5,253,348 | 10/1993 | Scalise | 395/325 |
| 5,257,391 | 10/1993 | DuLac et al. | 395/800 |
| 5,287,476 | 2/1994 | Keener et al. | 395/425 |
| 5,289,418 | 2/1994 | Youngerth | 365/201 |
| 5,363,492 | 11/1994 | King et al. | 395/325 |
| 5,379,384 | 1/1995 | Solomon | 395/325 |
| 5,392,407 | 2/1995 | Heil et al. | 395/325 |
| 5,542,053 | 7/1996 | Bland | 395/309 |
| 5,548,711 | 8/1996 | Brant | 395/182.03 |
| 5,572,660 | 11/1996 | Jones | 395/182.04 |
| 5,603,051 | 2/1997 | Ezzet | 395/822 |
| 5,608,876 | 3/1997 | Cohen | 395/281 |

FOREIGN PATENT DOCUMENTS

| | | | |
|---|---|---|---|
| 0416331 | 3/1991 | European Pat. Off. | G05B 19/417 |
| 0487901 | 6/1992 | European Pat. Off. | G06F 3/06 |
| 0629956 | 12/1994 | European Pat. Off. | G06F 13/40 |

*Primary Examiner*—Eric Coleman
*Attorney, Agent, or Firm*—Paul J. Maginot; Wayne P. Bailey

[57] ABSTRACT

A method for transferring data in a controller is disclosed which includes the steps of providing a processor having an internal first bus, providing a second bus, connecting a memory device to the second bus, connecting a disk drive to the second bus, transferring first data between the memory device and the processor across the first and second buses, and transferring second data between the memory device and the disk drive across the second bus. A disk array controller architecture is also disclosed.

19 Claims, 3 Drawing Sheets

METHOD AND APPARTUS FOR TRANSFERRING DATA IN A CONTROLLER HAVING CENTRALIZED MEMORY

BACKGROUND OF THE INVENTION

The present invention relates generally to a method and apparatus for transferring data in a controller having a centralized memory.

A PCI (Peripheral Component Interconnect) Local Bus is a known high performance, 32-bit or 64-bit bus with multiplexed address and data lines. It is intended for use as an interconnect mechanism between highly integrated peripheral controller components, peripheral add-in boards, and processor/memory systems. FIG. 1 is a block diagram of a known PCI Local Bus system architecture implemented in a personal computer 4. The processor/cache/DRAM (Dynamic Random Access Memory) subsystem is connected to a PCI Local Bus through a bridge/memory controller which provides a low latency path through which the processor may directly access PCI-based devices mapped anywhere in the memory or I/O address spaces. The bridge/memory controller also provides a path which permits PCI Local Bus masters direct access to the DRAM. U.S. Pat. No. 5,379,384 discloses a bridge/memory controller for use in the known PCI Local Bus system architecture. An exemplary bridge/memory controller chip set is the 82420 PCI set Cache/Memory Subsystem comprising an 82423TX Data Path Unit (DPU) and an 82424ZX Cache and DRAM Controller (CDC), manufactured by Intel Corporation.

The known PCI Local Bus system architecture has also been adapted to a disk array controller 6 as shown in FIG. 2. In addition to the processor/cache/DRAM subsystem and the bridge/memory controller, the disk array controller 6 includes a second DRAM connected to the PCI Local Bus through a RAID (Redundant Array of Independent Disks) Parity Assist (RPA) circuit. The disk array controller 6 also includes a System Input/Output (SIO) circuit which interfaces a bus such as an ISA (Industry Standard Architecture) bus to the PCI Local Bus, and one or more input/output processors (IOPs) which connect one or more disk drives 8 to the PCI Local Bus through a channel, such as a SCSI (Small Computer System Interface) bus. The SIO circuit includes arbitration logic which handles the PCI Local Bus arbitration. The disk drive 8 includes one or more storage media (not shown) such as disks connected to each channel. A plurality of additional controller resources such as nonvolatile RAM, flash EPROM, Serial I/O port etc. are connected to the ISA bus. The SIO circuit includes arbitration logic which handles the PCI Local Bus arbitration.

The first or main memory DRAM of the disk array controller 6 is typically implemented as a microprocessor code and data RAM for use in storing code and data for the processor. The second DRAM is typically implemented as a data transfer buffer for temporarily storing data to be read from or written to the one or more storage media across the PCI Local Bus. One disadvantage of the known PCI-based disk array controller architecture shown in FIG. 2 is the cost of providing two separate DRAM subsystems within the disk array controller. Thus, the known PCI-based dual memory controller architecture is not suitable for low cost disk array controller applications.

An additional disadvantage of the known PCI-based disk array controller architecture shown in FIG. 2 is that a portion of the bandwidth of the PCI Local Bus is consumed by non-disk array-related data transfers across the PCI Local Bus such as data transfers between the processor and the resources connected to the ISA bus. More specifically, the processor must first arbitrate for the PCI Local Bus, and once access to the PCI Local Bus is granted, data is transferred across the PCI Local Bus thereby reducing the capacity of the PCI Local Bus to transfer data to/from the disk drive.

SUMMARY OF THE INVENTION

In accordance with one embodiment of the present invention, there is provided a method for transferring data in a controller. The method includes the steps of providing a processor having an internal first bus, providing a second bus, connecting a memory device to the second bus, connecting a disk drive to the second bus, transferring first data between the memory device and the processor across the first and second buses, and transferring second data between the memory device and the disk drive across the second bus.

Pursuant to another embodiment of the present invention, there is provided a method for transferring data in a disk array controller. The method includes the steps of providing a microprocessor having an internal bus, providing a PCI Local Bus, connecting a memory device to the PCI Local Bus, and transferring data between the memory device and the microprocessor across the PCI Local bus and the internal bus in accordance with a burst mode fetch cycle of the microprocessor.

Pursuant to yet another embodiment of the present invention, there is provided a controller including a processor having an internal first bus, a second bus, a memory device connected to the second bus, a disk drive connected to the second bus, a mechanism for transferring first data between the memory device and the processor across the first and second buses, and a mechanism for transferring second data between the memory device and the disk drive across the second bus.

Pursuant to still yet another embodiment of the present invention, there is provided a disk array controller including a microprocessor having an internal bus, a PCI Local Bus, a memory device connected to the PCI Local Bus, and a mechanism for transferring data between the memory device and the microprocessor across the PCI Local bus and the internal bus in accordance with a burst mode fetch cycle of the microprocessor.

It is therefore an object of the present invention to provide a new and useful method for transferring data in a controller.

It is therefore an object of the present invention to provide an improved method for transferring data in a controller.

It is another object of the present invention to provide a new and useful controller.

It is another object of the present invention to provide an improved controller.

It is a further object of the present invention to provide a relatively low cost controller.

It is yet another object of this invention to provide a relatively low cost method for transferring data in a controller.

The above and other objects, features, and advantages of the present invention will become apparent from the following description and the attached drawings.

DETAILED DESCRIPTION OF THE PREFERRED EMBODIMENT

Figure 1:
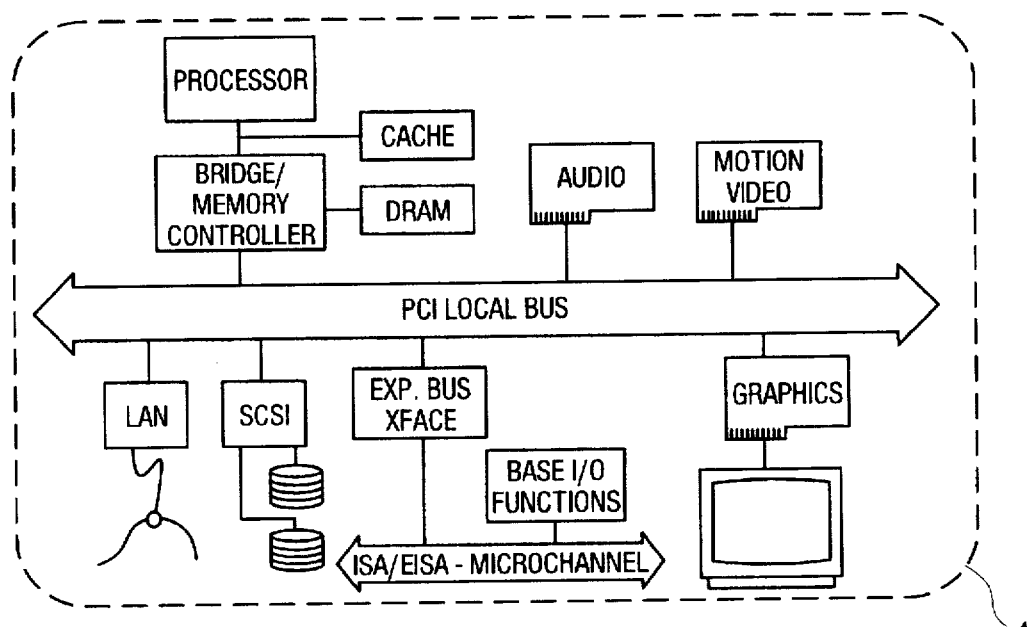
FIG. 1 is a block diagram of a prior art PCI Local Bus system architecture implemented in a personal computer environment.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 3:
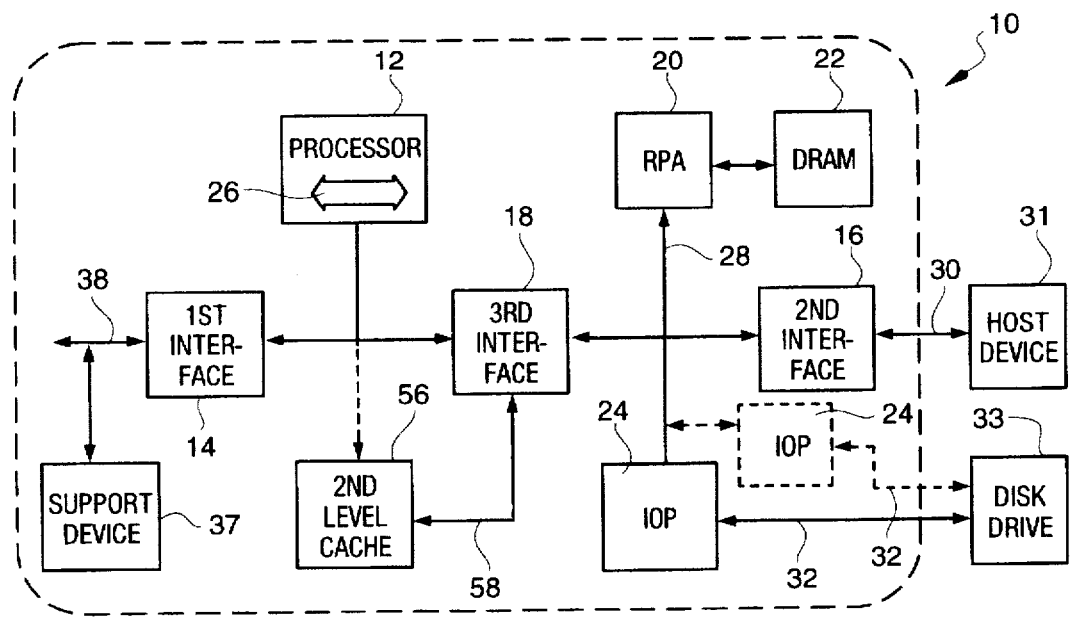
FIG. 3 is a block diagram of a first embodiment of a PCI-based disk array controller.

Referring now to FIG. 3, there is shown a block diagram of a PCI Local Bus-to-SCSI Bus disk array controller 10. The disk army controller 10 includes a main processor 12 such as a microprocessor, a first interface circuit 14, a second interface circuit 16, a third interface circuit 18, a RAID Parity Assist (RPA) circuit 20, a RAM device 22 such as a DRAM, and one or more input/output processors (IOPs) 24. In the embodiment being described, the main processor 12 is a microprocessor from the Intel 80486 family of microprocessors. An exemplary microprocessor is the 80486SX-33 that is available from Intel Corporation.

The processor 12 includes an internal local bus 26 and one or more external input/output pins or pads which provide external access to the internal local bus 26. The first interface circuit 14 and the third interface circuit 18 are connected to the internal local bus 26. The second interface circuit 16, third interface circuit 18, RPA circuit 20 and input/output processor 24 are connected to a PCI Local Bus 28. The second interface circuit 16 is also connected to a host PCI Local Bus 30 through a slot (not shown) such as a PCI Local Bus slot of a host device 31 such as a computer or a file server. The PCI Local Bus standard is defined in the document entitled *PCI Local Bus Specification, Revision* 2.1 which is available from the PCI Special Interest Group, P.O. Box 14070, Portland, Oreg. 97214, and which is incorporated herein by reference.

The input/output processor 24 is connected to one or more disk drives 33 through a channel 32, such as a SCSI bus. SCSI is a communications protocol standard for input/output devices. The first version of the standard, SCSI-1, is described in ANSI Document No. X3. 131–1986 which is incorporated herein by reference. The SCSI-1 specification has been upgraded with an expanded interface referred to as SCSI-2. The SCSI-2 specification is described in ANSI Document No. X3. 131–1994 which is also incorporated herein by reference.

It should be appreciated that additional disk drives 33 can be connected to the PCI Local Bus 28 through one or more additional input/output processors 24 and channels 32 as shown in phantom. An array of disk drives may incorporate a design termed "Redundant Array of Inexpensive Disks" (RAID). Five levels of RAID design, termed RAID-1 through RAID-5, are known in the art and are described in the publication entitled "A Case for Redundant Arrays of Inexpensive Disks (RAID)" by David A. Patterson, Garth Gibson and Randy H. Katz; University of California Report No. UCB/CSD 87/391, December 1987, which is incorporated herein by reference The input/output processor 24 executes ASIC-specific (Application Specific Integrated Circuit) instructions independent from controller firmware which is executed by the processor 12. An example of a suitable input/output processor is a SCSI Input/Output Processor (SIOP) 53C825A chip or 53C875 chip manufactured by Symbios Logic Inc. of Fort Collins, Colo. The 53C825A and 53C875 input/output processors execute SCRIPTS instructions which are an ASIC-specific instruction set specifically designed for controlling the 53C8XX family of Symbios Logic Inc. products.

The RPA circuit 20 includes memory controller circuitry and exclusive-OR (XOR) parity circuitry. During an exemplary read operation, the RPA circuit 20 functions as a PCI-based DRAM controller and the DRAM 22 functions as a cache buffer. More specifically, read data is initially sent from one or more disk drives 33 connected to the channel 32 through the input/output processor 24 and across the PCI Local Bus 28 to the DRAM 22. Once the read data is stored in the DRAM 22, the processor 12 schedules a second operation where the read data is sent from the DRAM 22 back across the PCI Local Bus 28 and through the second interface circuit 16 to the host device 31.

During an exemplary write operation, such as a RAID level 3 write operation, "new" write data is initially sent from the host device 31 through the second interface circuit 16 and across the PCI Local Bus 28 to a first location within the DRAM 22. The "old" data is then read from a data disk of the disk drive 33 across the PCI Local Bus 28 into a second location within the DRAM 22, and the "old" parity information is read from a parity disk of the disk drive 33 across the PCI Local Bus 28 into a third location within the DRAM 22. The RPA circuit 20 then independently and transparently performs conventional read-modify-write operations where "new" parity information is generated by exclusive-ORing the "old" data, "old" parity information and "new" data which are stored within the DRAM 22. After the "new" parity information is calculated and stored in a fourth location within the DRAM, the processor 12 schedules a write operation to write the "new" write data to a data disk of the disk drive 33 from the DRAM 22 and/or "new" parity information to a parity disk of the disk drive 33 from the DRAM 22. An example of a suitable RPA circuit 20 is the RAID Parity Assist chip provided by Symbios Logic Inc. as part of their existing controller products.

Figure 2:
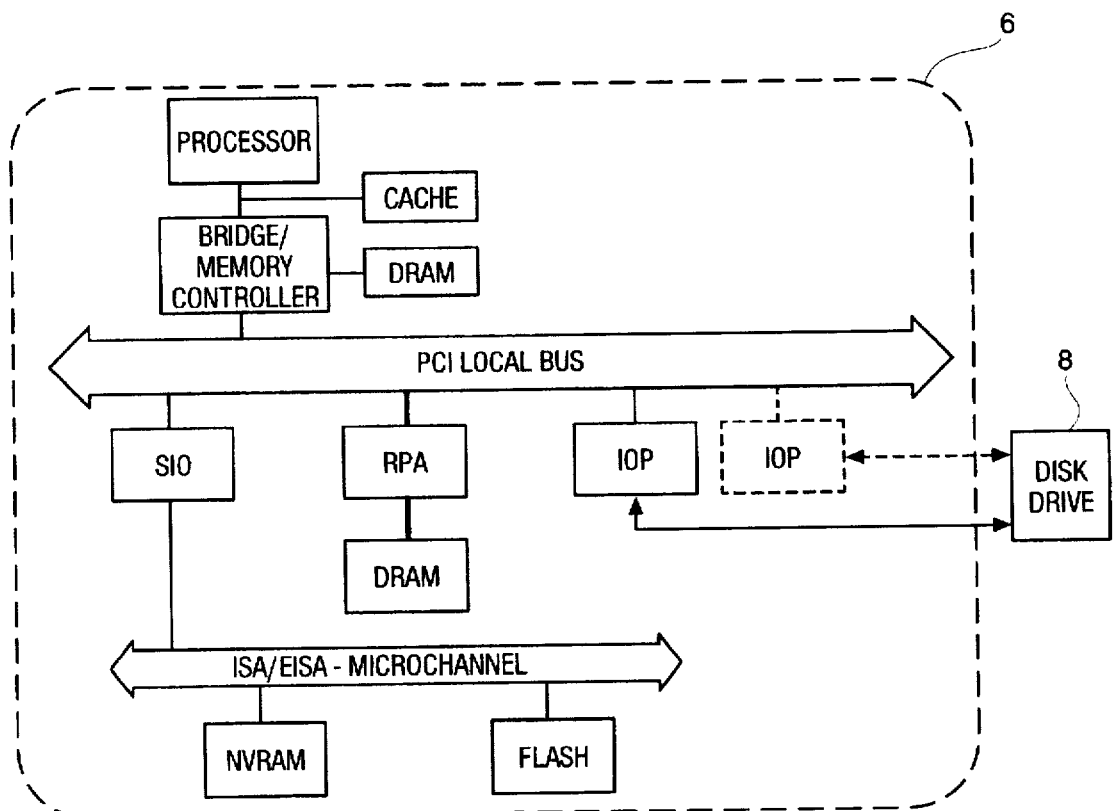
FIG. 2 is a block diagram of a prior art PCI Local Bus system architecture implemented in a disk array controller environment.

The first interface circuit 14 includes circuitry for interfacing the processor 12 to one or more controller resources or devices 37 such as a battery-backed RAM and a flash EPROM which are connected to an auxiliary bus 38 such as, or similar to an ISA bus. In operation, non-disk array-related data transfers to/from the processor 12 are sent across the processor local bus 26 through the first interface chip 14. It should be appreciated that this is an advantage over prior art designs such as shown in FIG. 2 in that the prior art architecture requires that non-disk array-related data transfers are sent across the PCI Local Bus thus consuming any portion of its available bandwidth. In contrast, the architecture of the present invention does not require non-disk array-related activity to be sent across the PCI Local Bus 28, thus increasing the bandwidth available for disk array-related data transfers across the PCI Local Bus 28.

Figure 5:
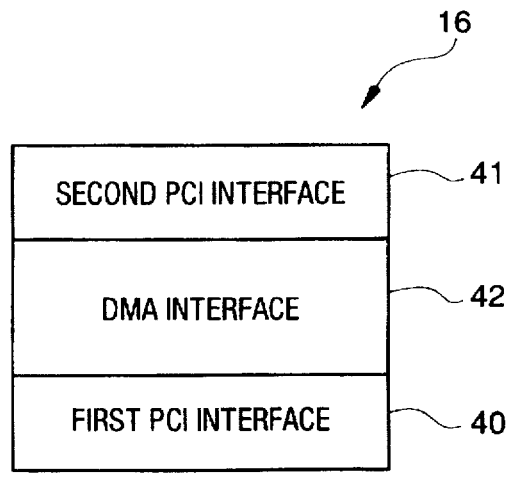
FIG. 5 is a block diagram of a second interface circuit of the disk array controllers shown in FIG. 3.

The second interface circuit 16 includes circuitry for interfacing the PCI Local Bus 28 to the host PCI Local Bus 30. As shown in FIG. 5, the second interface circuit 16 includes a first PCI interface circuit 40, a second PCI interface circuit 41 and a high-bandwidth DMA (Direct Memory Access) interface circuit 42.

The first PCI interface 40 implements a conventional SCRIPTS engine which minimizes software impact by permitting existing software drivers to operate with the PCI-based controller 10. More specifically, when the host device 31 initiates a disk read/write operation, the host device 31 can use existing SCSI device drivers as well as performance enhanced disk array drivers to communicate with the PCI-based controller 10.

For example, when the host device 31 desires to write 64-Kbytes of data that is stored in separate blocks throughout the host memory to the disk drive, the host device 31 provides a conventional scatter-gather list to the SCRIPTS engine of the first PCI interface 40. The scatter-gather list indicates where the blocks of write data are located in a host memory map. The SCRIPTS engine implemented in the first PCI interface 40 uses the scatter-gather list to build linked DMA (Direct Memory Access) operations which fetch the blocks of write data from the host device. The second PCI interface 41 implements a separate conventional SCRIPTS engine which builds a separate scatter-gather list to indicate where the blocks of write data are to be stored in the disk drive. Thus, the total length of write data transferred e.g. 64-Kbytes, is the same on both sides of the second interface circuit 16. However, the SCRIPTS engines in the first and second PCI interfaces 40, 42 operate independently to transfer the blocks of write data from one scatter-gather list to a separate scatter-gather list across the DMA interface 44. In addition, the DMA interface decouples or buffers the operating speeds between the first and second PCI interfaces 40, 41. For example, the host device PCI Local Bus 30 could be operating at 25 MHz while the disk array PCI Local Bus 28 is operating at 33 MHz.

Figure 6:
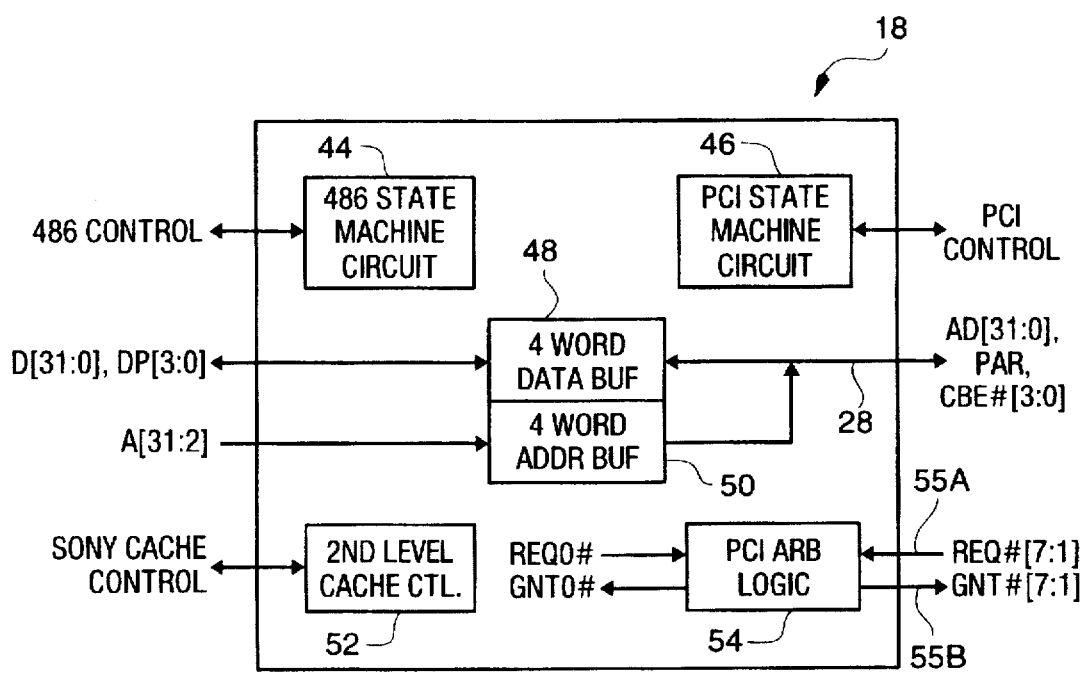
FIG. 6 is a block diagram of a third interface circuit of the disk array controller shown in FIGS. 3 and 4.

The third interface circuit 18 serves as a PCI bus master relative to the devices on the PCI Local Bus 28, and serves as both a PCI bus master and a PCI bus slave relative to the processor 12. As shown in FIG. 6, the third interface circuit includes circuit 44 which implements a first state machine such as an Intel 80486 state machine, circuit 46 which implements a second state machine such as a PCI Local Bus state machine, 4-word data buffer 48, 4-word address buffer 50, second level cache control circuitry 52 and arbitration logic 54.

The first and second state machines that are implement by circuits 44, 46 cooperate to conveal or translate processor 12 bus cycles or control signals to equivalent PCI Local Bus 28 cycles or control signals in a known manner. In addition, the first and second state machines that am implemented by the circuits 44, 46 permit processor 12 burst mode code and data fetching across the PCI Local Bus 28 by converting or translating processor 12 burst mode fetch cycles or instructions to equivalent PCI Local Bus 28 cycles as would be known to one of ordinary skill in the art.

More specifically, the first state machine implemented by the circuit 44 translates Intel 80486SX/DX/DX2 burst mode fetch cycles of the processor 12 into appropriate PCI Local Bus 28 cycles. The appropriate PCI Local Bus cycles are defined in the above-identified document entitled PCI *Local Bus Specification, Revision* 2.1. The processor 12 burst mode fetch cycles are defined in the Intel 80486XX data book which is incorporated herein by reference. The third interface circuit 18 also includes circuitry for fetching the processor code and/or data from the DRAM 22 across the PCI Local Bus 28 in linear address order, and presenting the code/data to the processor 12 in the nonlinear address order required by the processor 12.

The 4-word data and address buffers 48, 50 are used for executing posted writes to a device connected to the PCI Local Bus 28. In operation, the write data from the processor 12 is latched into the data buffer 48 until the PCI Local Bus 28 is available for transferring the write data to the device designated in the address buffer 50. In addition, posted write data from the processor 12 will be transferred out of the address buffer 50 across the PCI Local Bus 28 in a burst if the processor 12 executes a number of posted write operations to consecutive memory addresses of the DRAM 22.

The second level cache control circuit 52 (FIG. 6) supports an optional look-aside secondary cache 56 (FIG. 3) through one or more control lines 58 (FIG. 3). A suitable look-aside second level cache is the CXK78486Q1-33 (cache-1C) integrated cache/controller chip, or the CX784862Q-33 (cache-2) integrated cache/controller chip, both of which are available from SONY Corporation. The SONY chips are designed to work with the Intel 80486 family of processors by connecting directly to the processor local bus 26 as shown in phantom (FIG. 3), and caching data in a look-aside manner with minimal connection to the third interface circuit 18. More specifically, the cache control circuits necessary to support secondary cache 56 are internal to the secondary cache 56 rather than being included in the third interface chip 18 as provided in the known Intel 82424ZX CDC chip. The third interface circuit 18 includes a support circuit which fetches code/data from the DRAM 22 or disk drive 33 in the event that the particular code/data requested by the processor 12 is not present in the first level cache internal to the processor 12 or the second level cache 56.

The PCI arbitration logic 54 handles all of the arbitration between the devices connected to the PCI Local Bus 28 through request lines 55a and grant lines 55b. If no devices are arbitrating for the PCI Local Bus 28, then by definition the third interface circuit 18 is granted access to the PCI Local Bus 28 for use in executing processor 12 bus cycles across the PCI Local Bus 28 such as fetching code from the DRAM 22 during a processor 12 burst code fetch operation. Many known arbitration schemes are suitable for implementation in the third interface circuit 18.

Figure 4:
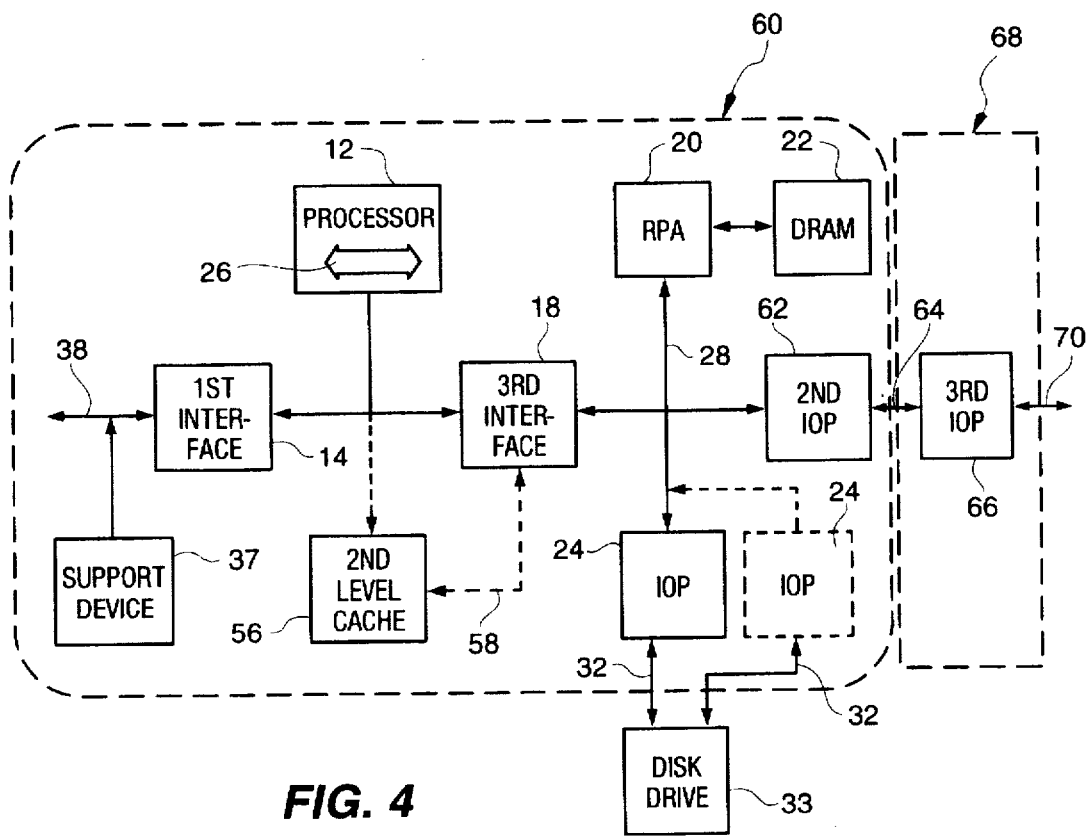
FIG. 4 is a block diagram of a second embodiment of a PCI-based disk array controller.

Referring now to FIG. 4, there is shown a SCSI Bus-to-SCSI Bus disk array controller 60. The same reference numerals are used to identify the same devices in FIGS. 3 and 4. The controller 60 includes a second input/output processor (IOP) 62 connected to the PCI Local Bus 28 in place of the second interface chip 16 (FIG. 3). The second input/output processor 62 is also connected through one or more cables 64, such as SCSI cables, to a third input/output processor (IOP) 66 associated with a SCSI host adapter 68 that is connected to a host SCSI Bus 70 through a slot (not shown) of a host device (not shown). It should be appreciated to one of ordinary skill in the art that data can be transferred between the second and third input/output processors 62, 63 such as 53C825A SCSI Input/Output Processor chips, at a rate of approximately 20 MByte/sec, or 40 MByte/sec for a 53C875 chip. In contrast, data can be transferred between the first and second PCI interfaces 40, 41 (FIG. 5) at a rate of 132 Mb/sec which is the specified data transfer rate of the PCI Local Bus 28.

In effect, the second input/output processor 62 functions in the same manner as the second PCI interface 41 (FIG. 5), and the third input/output processor 66 functions in the same manner as the first PCI interface 40 (FIG. 5). Thus, data is transferred from one scatter-gather list to a separate scatter-gather list across a common SCSI-interface in the disk array controller 60 shown in FIG. 4. In contrast, the second interface circuit 16 (FIG. 3) transfers data from one scatter-gather list to a separate scatter-gather list across the high-bandwidth DMA interface 42 (FIG. 5) in the controller 10.

In sum, the disk array controller architecture of the present invention improves the price/performance ratio of the controller 10 by permitting burst mode code/data fetching across the PCI Local Bus 28 through the third interface circuit 18, by providing code/data caching capability across the PCI Local Bus 28 through the third interface circuit 18, and by off-loading bandwidth to the auxiliary bus 38 across the internal local bus 26.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method for transferring data in a controller comprising the steps of:

providing the controller with a processor and a processor bus which are coupled together;

providing the controller with a memory and a second bus which are coupled together;

providing the controller with an interface which connects the processor bus to the second bus; and transferring data across the processor bus and the second bus in a burst mode, said data being transferred from the memory to the processor across the processor bus in accordance with first burst mode cycles and across the second bus in accordance with second burst mode cycles, wherein the data transferring step includes the step of translating with the interface the first burst mode cycles into equivalent second burst mode cycles.

2. The method of claim 1, wherein:

the translating step translates burst mode fetch cycles of the processor into PCI bus cycles.

3. The method of claim 2, wherein:

said first bus operates in accordance with a first bus protocol, and said second bus operates in accordance with a second bus protocol which is different from the first bus protocol.

4. The method of claim 1, wherein:

the translating step translates bus cycles of an Intel 80486 microprocessor into equivalent PCI bus cycles.

5. The method of claim 1, further comprising the steps of:

transferring first write data having a first memory address from the processor to an interface between the processor bus and the second bus;

transferring from the processor to the interface, second write data having a second memory address that is contiguous with the first memory address; and transferring the first write data and the second write data from the interface to the memory in a burst mode.

6. The method of claim 1, wherein:

the transferring step transfers processor-executable code from the memory device to the processor.

7. The method of claim 6, further comprising the steps of:

transferring to the memory, second data from a host device that is coupled to the controller; and transferring the second data from the memory to a disk drive that is coupled to the controller.

8. A computer system, comprising:

a controller having a processor bus, a processor coupled to said processor bus, a second bus, a memory device coupled to said second bus, an input/output processor coupled to said second bus, a first interface coupled to said second bus, and a second interface coupled between said processor bus and said second bus, said second interface configured to (1) translate first burst mode cycles of said processor bus into equivalent second burst mode cycles for said second bus, and (2) control a burst mode data transfer from said memory to said processor;

a host device coupled to second bus via said first interface; and a disk drive coupled to said second bus via said input/output processor.

9. The computer system of claim 8, wherein:

said first interface controls a first transfer of second data from said host device to said memory, and said input/output processor controls a second transfer of said second data from said memory to said disk drive.

10. The controller of claim 8, wherein:

said memory is configured to store (1) code for said processor, (2) data for said processor, and (3) data being transferred between said disk drive and said host device.

11. The controller of claim 8, wherein:

said second interface includes a plurality of data buffers and a plurality of address buffers configured to latch (1) first write data and first address from said processor, and (2) second write data and second address from said processor, and said second interface is configured to transfer said first write data and said second write data to said memory in a burst mode if said first address and said second address are consecutive addresses.

12. The computer system of claim 8, wherein:

said first interface includes a first state machine coupled to said processor bus and a second state machine coupled to said second bus, and said first state machine and said second state machine cooperate to convert said first burst mode cycles of said processor bus into said second burst mode cycles of said second bus.

13. The computer system of claim 12, wherein:

said processor is an Intel 80486 microprocessor, said processor bus is an Intel 80486 microprocessor bus, said second bus is a PCI bus, and said first state machine and said second state machine cooperate to convert bus cycles of said Intel 80486 microprocessor into bus cycles for said PCI bus.

14. A controller comprising:

a processor bus;

a processor coupled to said processor bus;

a second bus;

a memory device coupled to said second bus; and an interface coupled between said processor bus and said second bus, said interface configured to (1) translate first burst mode cycles of said processor bus into equivalent second burst mode cycles for said second bus, and (2) control a burst mode data transfer from said memory to said processor.

15. The controller of claim 14, further comprising:

an input/output processor coupled to said second bus and configured to control a transfer of second data to said memory from a disk drive coupled to said input/output processor; and a second interface coupled to said second bus and configured to control a transfer of said second data from said memory to a host device coupled to said second interface.

16. The controller of claim 14, wherein:

said memory is configured to store (1) code for said processor, (2) data for said processor, and (3) data being transferred between a disk drive coupled to said second bus and a host device coupled to said second bus.

17. The controller of claim 14, wherein:

said interface includes a plurality of data buffers and a plurality of address buffers configured to latch (1) first write data and first address from said processor, and (2) second write data and second address from said processor, said interface is configured to transfer said first write data and said second write data to said memory in a burst mode if said first address and said second address are consecutive addresses.

18. The controller of claim 14, wherein:

said interface includes a first state machine coupled to said processor bus and a second state machine coupled to said second bus, and said first state machine and said second state machine cooperate to convert said first burst mode cycles of said processor bus into said second burst mode cycles of said second bus.

19. The controller of claim 18, wherein:

said processor is an Intel 80486 microprocessor, said processor bus is an Intel 80486 microprocessor bus, said second bus is a PCI bus, and said first state machine and said second state machine cooperate to convert bus cycles of said Intel 80486 microprocessor into bus cycles for said PCI bus.

\* \* \* \* \*